Aug. 29, 1950
R. J. REEK ET AL
2,520,736
GUN TURRET
Filed March 10, 1945
2 Sheets-Sheet 1
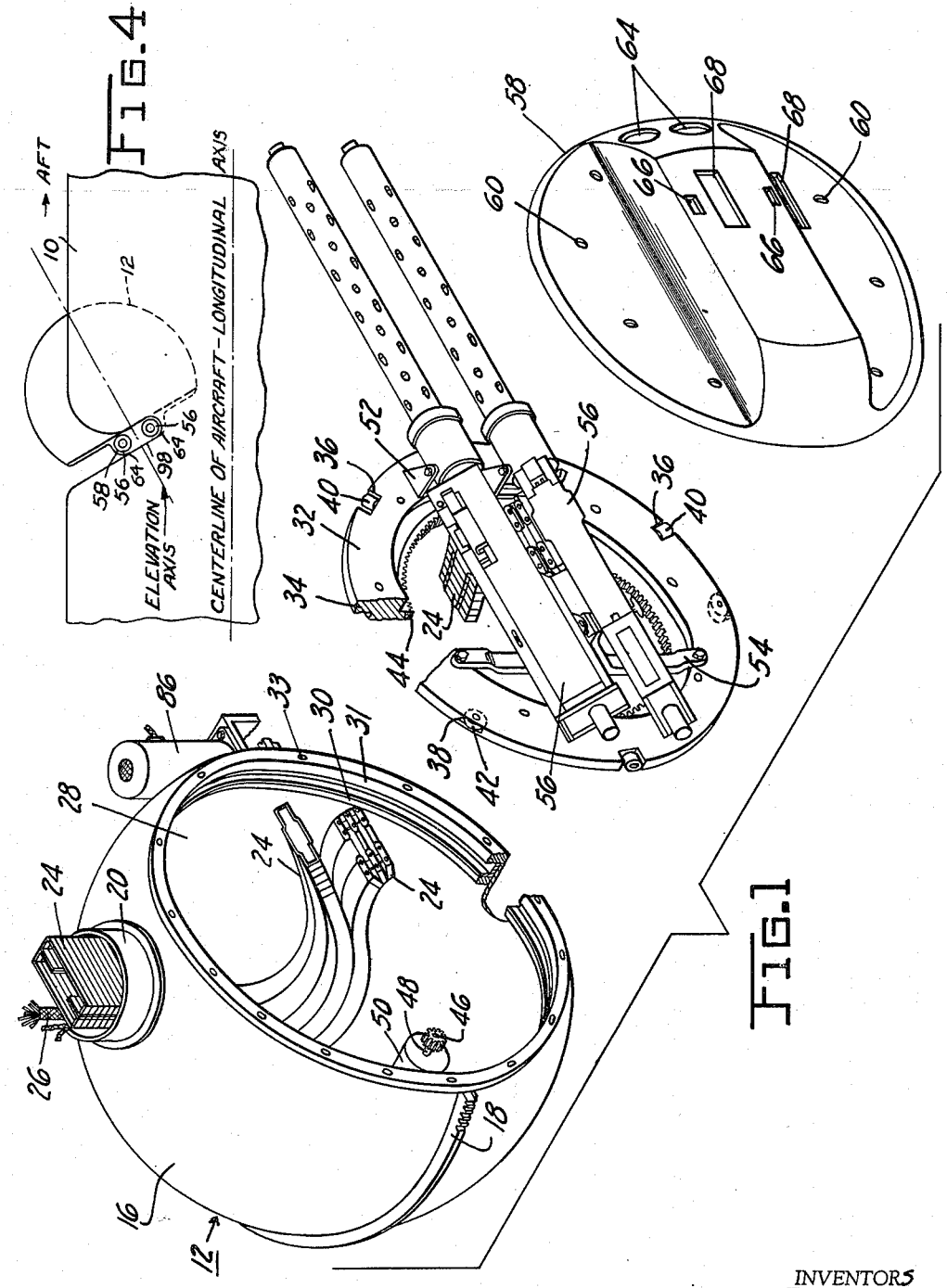
INVENTORS
ROYAL J. REEK
FRANK V. KUZMITZ
BY Cecil J Arens
ATTORNEY

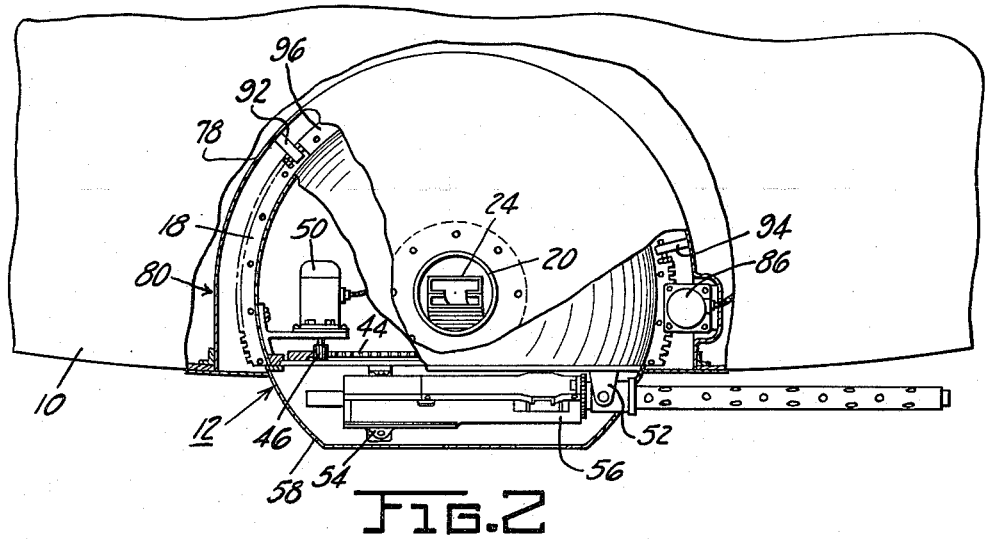
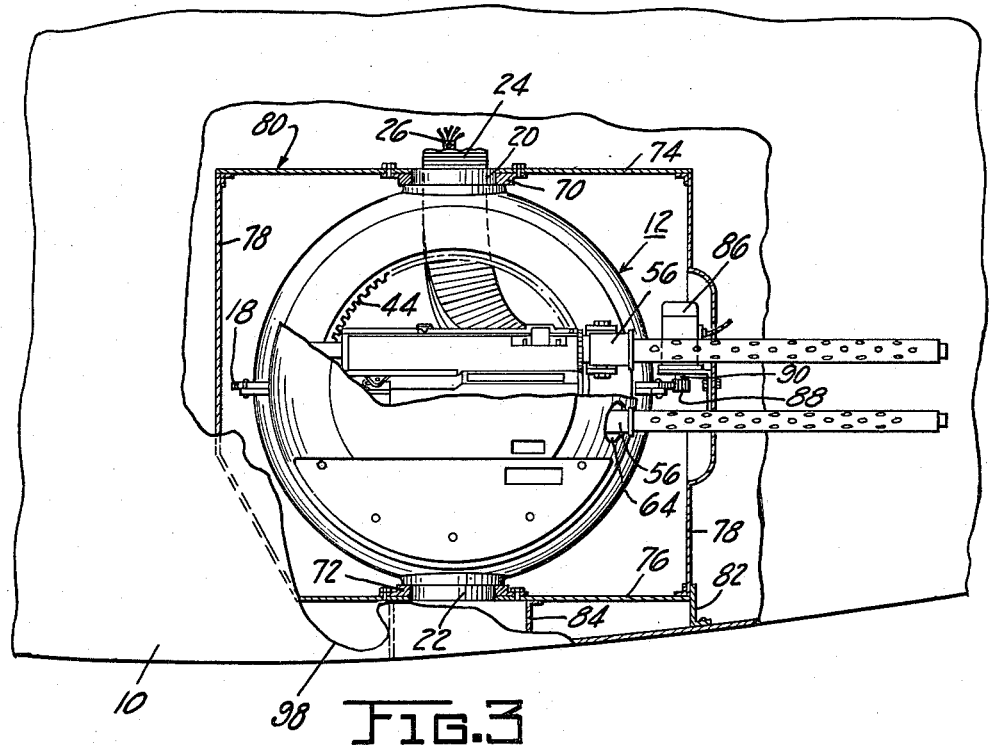

Patented Aug. 29, 1950

2,520,736

UNITED STATES PATENT OFFICE 2,520,736

GUN TURRET

Royal J. Reek and Frank V. Kuzmitz, South Bend, Ind., assignors to Bendix Aviation Corporation, South Bend, Ind., a corporation of Delaware Application March 10, 1945, Serial No. 582,002

5 Claims. (Cl. 89—37.5)

This invention relates to improvements in gun turrets for aircraft and has for its primary object to mount a plurality of guns on one side of the azimuth pivot axis for movement over a wide range in azimuth and elevation.

The use of a ball turret of conventional design, in which the guns are mounted, one on each side of the azimuthal pivotal axis has the disadvantage of an extremely limited azimuthal field of fire where the turret is mounted in the side of an airplane. Manifestly, in such a case if the upper and lower turrets were knocked out of operation enemy aircraft could approach from the rear, for example, without fear of harassment.

Therefore, one of the most important objects of the invention resides in the provision of a ball turret which mounts guns on one side only of its azimuth pivot axis to attain a maximum field of fire.

Another object of the invention is to provide a ball turret disposed in the side of an aircraft and having guns mounted on one side only of the azimuth pivot axis of the turret so that the guns will have an extremely wide field of fire which includes the aft of the aircraft.

A still further object of the invention is the provision of a gun turret which when mounted in the side of an aircraft has its azimuth pivot axis so located in the fuselage that a minimum of turret projects beyond the skin of the aircraft.

A further object of the invention resides in the provision of a gun turret which when mounted in the waist of an aircraft has a field of fire which overlaps the field of fire of other turrets mounted on said aircraft.

Further details of the invention, the manner of operation thereof, and the constructional advantages thereof are hereinafter described in greater detail with reference to the accompanying drawings, in which:

Figure 1 is an exploded view of the turret showing the main parts isometrically;

Figure 2 is a fragmentary plan view looking down on one side of the airplane and upon the turret;

Figure 3 is an elevational view with the side of the airplane broken away to show the turret structure which is partly in section; and Figure 4 is a bottom view of the airplane with the nacelle cut away to obtain maximum turret movement.

Referring to the drawings, the reference numeral 10 designates an airplane having a cross sectional area substantially circular in shape and in which a ball turret 12 is mounted for rotation. The turret comprises a ball member or truncated spherical shell 16 having a gear sector 18 fixed thereto for rotating the ball in azimuth. The turret is supported in the airplane by upper and lower azimuth journals 20 and 22 for carrying the radial loads and the thrust and radial loads respectively. The upper journal 20 is of tubular construction to admit flexible ammunition chuting 24, electrical cables 26, etc. These journals provide a vertical axis about which the turret is pivoted azimuthly. Of course, it is recognized that the journals may be designed so that the upper journal carried the radial and thrust load and a lower journal carried the radial load only. An opening 28 is formed in the ball-like member 16. A bearing race comprised of the ring-like elements 30 and 31 circumscribes the opening 28 and is rigidly secured to the ball 16 in any suitable manner. In this instance the element 30 is pressed into the opening 28 of ball 16 and the element 31 is fastened to the element 30 by screws 33. Mounted on one side of the azimuth pivot and in the bearing race 30 for rotation in elevation, is a turn-table 32, provided with a flanged element 34 recessed at 36 and 38 to receive rollers 40 and 42 respectively for engagement with the bearing race 30. The axis of rotation of the turn-table is perpendicularly located with respect to the turret azimuth axis of rotation. A ring gear 44 is carried by the turn-table 32 and is constructed and arranged to mesh with a pinion 46 splined to a shaft 48 which is connected through proper gearing, not shown, to an elevational drive motor 50 which is fixed to the ball 16.

Front and rear gun supports or brackets 52 and 54 respectively are secured to the turn-table for carrying guns 56. A streamlined cover 58 is attached to the turn-table 32, by quick detachable fittings not shown, which pass through holes 60 and engage the turn-table. The cover is provided with openings 64 to receive the barrels of the guns 56. A pair of slits 66 and 68 for each gun are formed in the cover adjacent the ejecting mechanism of each gun to allow ammunition clips and casings respectively to be discharged.

The turret 12 is mounted in the aircraft in a manner which will permit its removal as an integral unit. Bearings 70 and 72 cooperate with the upper and lower journals 20 and 22 respectively. These bearings are secured to structural members 74, 76 and 78 comprising a well 80 in which the turret revolves. The well 80 is in turn securely anchored to the aircraft 10 as at 82 and 84. An azimuth drive motor 86 is carried by the well 80 and has a pinion gear 88 splined to shaft 90 of said motor. The pinion 88 meshes with the azimuth gear sector 18. A pair of adjustable stops 92 and 94 are fixed to the structure 78 and disposed in the well 80 to be engaged by a bumper lug 92 integral with the turret to thereby limit the azimuthal rotation of the turret.

To permit maximum azimuthal rotation fore of the aircraft when the guns are pointed straight down the lower portion of the fuselage of the aircraft is cut out at 98. With the turret mounted in the side of the aircraft and aft thereof, as shown in Figures 2 and 3, it will be noted that the azimuth pivot axis is located inside the aircraft so that a very small part only of the turret projects beyond the skin of the fuselage. This arrangement minimizes the drag on the aircraft. The turntable 32, on which the guns 56 are mounted for elevational movement, is rotated in the bearing race about an axis which is perpendicular to the plane of rotation of said turn-table and to the azimuth axis of the turret. This arrangement of the guns on the turn-table, that is, mounting the guns and turn-table on one side of the azimuthal axis of rotation of the turret, permits the guns to be pointed straight aft along the side of the aircraft to protect its tail from enemy fire, see Figure 3. Also, the guns may be depressed or elevated from this aft position. Likewise, the guns may be moved horizontally from the extreme horizontal aft position or any other elevational position to which the guns have been moved to a position fore of the aircraft. The construction and arrangement of the gun turret as above described enables a gunner to operate the guns over a field of fire heretofore not believed possible by a waist turret.

We claim:

1. A gun turret for mounting in the side of an aircraft comprising a ball member having vertically disposed journals diametrically located for supporting the ball member on a vertical axis for azimuthal movement, a gear sector secured to the ball member, a means for engaging the gear sector to rotate the ball azimuthally, a turn-table mounted on one side of the vertical axis and supported by the ball member, and guns carried by the turn-table, said guns arranged for positioning along the side of the aircraft substantially parallel thereto said turn-table being constructed and arranged for elevational movement about an axis perpendicular to said vertical axis, said turn-table and ball member together forming a structure having a relatively smooth exterior surface which has less than one third of said surface projecting beyond the side of said aircraft regardless of the position of the guns, to thereby keep drag at a minimum.

2. A gun turret for mounting in the side of an aircraft comprising a ball member having vertically disposed journals diametrically located for supporting said ball member in the aircraft for azimuthal rotation of said ball member about said journals as a pivot, a gear sector circumferentially secured to said ball member, a means for engaging the gear sector to rotate said ball member azimuthally, a turn-table mounted on one side of said journals, guns mounted on the turn-table, said guns arranged on the turn-table for positioning along the side of the aircraft substantially parallel thereto and contiguous therewith when pointing aft rollers mounted around the periphery of said turn-table, a bearing race carried by said ball and constructed and arranged to cooperate with the rollers, a ring gear carried by said turn-table, and means within said ball for engaging said ring gear to rotate the turn-table, whereby the guns are elevated and depressed.

3. In a gun turret for use in the waist of an aircraft, a truncated sphere having vertically disposed journals diametrically located and fixed thereto for supporting said sphere in the aircraft for rotation of said sphere in azimuth about said journals as a pivot, a gear sector secured to the truncated sphere, means mounted in said aircraft for engaging the gear sector for rotating said sphere, a turn-table located on one side of said pivot and carried by said sphere, said turn-table being constructed and arranged to rotate about an axis perpendicular to the truncation of the sphere, and guns mounted on said turn-table, said guns arranged on the turn-table for positioning along the side of the aircraft substantially parallel thereto and contiguous therewith when pointing aft, whereby a relatively wide field of fire is obtained.

4. An aircraft structure having an approximately circular opening in its skin, a ball member having vertically disposed journals for support in said aircraft structure for azimuthal rotation of said ball member, said ball member having an opening disposed normal to said journals and arranged to be positioned substantially coaxial with the opening in the skin, a turn-table supported in the opening of the ball member for elevational rotation, guns mounted on the turn-table, said guns being arranged on said turn-table to point aft and substantially parallel with and externally of the skin of the aircraft when the two openings are in coaxial relationship, and means for changing the angular relationship between the axes of said openings, whereby said guns will be rotated fore of the aircraft, and means for rotating said turn-table for changing the elevational position of the guns irrespective of the angular relationship between the axes of said openings.

5. A gun turret for mounting in the side of an aircraft comprising a ball member having vertically disposed journals diametrically located for supporting said ball member in the aircraft for azimuthal rotation about said journals as an axis, a gear sector circumferentially secured to said ball, means for engaging the gear sector to rotate said ball circumferentially, a turn-table rotatable in elevation about an axis located substantially at right angles to the axis of the ball member and carried thereby in offset relationship to the axis thereof, a plurality of guns mounted on the turn-table in parallel relationship and offset with respect to the axis of rotation thereof, said turn-table having the guns arranged thereon for positioning along the side of the aircraft substantially parallel thereto and contiguous therewith, whereby the aft of the aircraft can be brought within the field of fire, rollers mounted around the periphery of the turn-table, a bearing race carried by said ball member and constructed and arranged to cooperate with the rollers, a ring gear carried by said turn-table, and means within said ball member for engaging said ring gear to rotate the turn-table to thereby elevate and depress the guns.

R. J. REEK.
FRANK V. KUZMITZ.

REFERENCES CITED

The following references are of record in the file of this patent:

UNITED STATES PATENTS

| Number | Name | Date |
|---|---|---|
| 2,199,971 | Sanders | May 7, 1940 |
| 2,336,557 | McCallister | Dec. 14, 1943 |
| 2,364,425 | Corte | Dec. 5, 1944 |
| 2,371,324 | Trotter | Mar. 13, 1945 |
| 2,377,073 | Eaton | May 29, 1945 |

FOREIGN PATENTS

| Number | Country | Date |
|---|---|---|
| 341,938 | Italy | July 16, 1936 |
| 515,992 | Great Britain | Mar. 23, 1937 |
| 515,993 | Great Britain | June 29, 1937 |